US011923183B2

(12) United States Patent
Simmons et al.

(10) Patent No.: US 11,923,183 B2
(45) Date of Patent: Mar. 5, 2024

(54) DYNAMIC EQUILIBRATION TIME CALCULATION TO IMPROVE MS/MS DYNAMIC RANGE

(71) Applicant: DH TECHNOLOGIES DEVELOPMENT PTE. LTD., Singapore (SG)

(72) Inventors: Douglas Arnold Simmons, Whitby (CA); Nic G. Bloomfield, Newmarket (CA)

( * ) Notice: Subject to any disclaimer, the term of this patent is extended or adjusted under 35 U.S.C. 154(b) by 137 days.

(21) Appl. No.: 17/659,324

(22) Filed: Apr. 14, 2022

(65) Prior Publication Data

US 2023/0335386 A1 Oct. 19, 2023

Related U.S. Application Data

(63) Continuation of application No. 16/639,161, filed as application No. PCT/IB2018/056688 on Aug. 31, 2018, now abandoned.

(51) Int. Cl.
*H01J 49/00* (2006.01)
*H01J 49/06* (2006.01)

(52) U.S. Cl.
CPC ........ *H01J 49/067* (2013.01); *H01J 49/0031* (2013.01); *H01J 49/0036* (2013.01); *H01J 49/0045* (2013.01)

(58) Field of Classification Search
CPC .. H01J 49/067; H01J 49/0031; H01J 49/0036; H01J 49/0045
USPC .................................................. 250/281, 282
See application file for complete search history.

(56) References Cited

U.S. PATENT DOCUMENTS

2020/0234936 A1* 7/2020 Simmons ............. H01J 49/004

* cited by examiner

*Primary Examiner* — Michael Maskell
(74) *Attorney, Agent, or Firm* — Kasha Law LLC; John R. Kasha; Kelly L. Kasha

(57) ABSTRACT

Dynamic skimmer pulsing and dynamic equilibration times are used for MS and MS/MS scans. A target percentage transmission of the ion beam is calculated based on a previous percentage transmission and a previous TIC or a previous highest intensity of a previous cycle time. An equilibration time is calculated based on the current percentage transmission and the target percentage transmission. A skimmer of a tandem mass spectrometer is controlled to attenuate the ion beam to the target percentage transmission to prevent saturation of a detector of the tandem mass spectrometer and to increase the dynamic range of the tandem mass spectrometer. The tandem mass spectrometer is controlled to perform an MS scan or an MS/MS scan after the calculated equilibration time to reduce the cycle time.

15 Claims, 11 Drawing Sheets

700

DYNAMIC EQUILIBRATION TIME CALCULATION TO IMPROVE MS/MS DYNAMIC RANGE

RELATED APPLICATIONS

This application is a continuation of U.S. patent application Ser. No. 16/639,161, filed on Feb. 14, 2020, which claims the benefit of U.S. Provisional Patent Application No. 62/552,543, filed on Aug. 31, 2017, the entire contents of all of which are incorporated herein by reference.

FIELD

The present application relates to the field of mass spectrometry. In particular, the present application relates to a system and method for operating a mass spectrometer.

BACKGROUND

Mass spectrometers are often coupled with chromatography or other separation systems in order to identify and characterize eluting known compounds of interest from a sample. In such a coupled system, the eluting solvent is ionized and a series of sequential mass spectra are obtained from the ionized solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in the sample. More particularly, the retention times of peaks and/or the area of peaks are used to identify or characterize (quantify) a known peptide or compound that has been separated from other compounds in the sample by chromatography.

In traditional separation-coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion detected during each MS/MS scan is collected over time and may be analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions to produce a product ion spectrum for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The size of the precursor ion mass window may be varied depending upon the analysis being performed. For instance, the precursor ion mass selection window used to scan the mass range can be very narrow so that the likelihood of multiple precursors within the window is small. This type of DIA method is called, for example, $MS/MS^{ALL}$. In an example of a $MS/MS^{ALL}$ method, a precursor ion mass selection window of about 1 amu is scanned or stepped across an entire mass range. In this example a product ion spectrum is produced for each 1 amu precursor mass window. The time it takes to analyze or scan the entire mass range once is referred to as one scan cycle.

Scanning a narrow precursor ion mass selection window across a wide precursor ion mass range during each cycle, however, is not practical for some instruments and experiments. In these cases, a larger precursor ion mass selection window, or selection window with a greater width, may be stepped across the entire precursor mass range. This type of DIA method is called, for example, SWATH acquisition. In a SWATH acquisition, the precursor ion mass selection window stepped across the precursor mass range in each cycle may have a width of 5-25 amu, for example, or even larger. Like the $MS/MS^{ALL}$ method, all the precursor ions in each precursor ion mass selection window are fragmented, and all of the product ions of all of the precursor ions in each mass selection window are mass analyzed.

U.S. Pat. No. 8,809,770 describes how SWATH acquisition can be used to provide quantitative and qualitative information about the precursor ions of compounds of interest. In particular, the product ions found from fragmenting a precursor ion mass selection window are compared to a database of known product ions of compounds of interest. In addition, ion traces or XICs of the product ions found from fragmenting a precursor ion mass selection window are analyzed to provide quantitative and qualitative information.

In mass spectrometers a skimmer may be included in the ion path that is operative to attenuate the ion beam by means of a gating or pulsing lens. In order to increase the sensitivity of the MS instrument the lens may be opened to allow the full ion beam to pass the skimmer. In cases where a strong signal may saturate the detector the lens may be restricted to attenuate the ion beam and only permit passage of a portion of the ion beam. Previous systems have been operative to vary the attenuation factor, also referred to as skimmer pulsing, by adjusting the attenuation factor of the lens within a single scan in order to allow for full passage of the ion beam to increase sensitivity when the expected ion current of the ion beam is low and to restrict the lens to attenuate the ion beam when the expected ion current is high. This skimmer pulsing avoids detector saturation during the scan while still maintaining high sensitivity during times of low ion current.

A problem with skimmer pulsing is that the ion beam does not react instantaneously to changes and accordingly an equilibration time is required after pulsing the skimmer to permit the ion beam to equilibrate with the new lens attenuation setting. While this is not a concern in many MS experiments, it does create a lag or delay which can introduce significant overhead in certain scenarios.

Accordingly, there is a need for systems and methods that improve upon the systems and/or methods described in the prior art.

SUMMARY

In some embodiments methods are provided for dynamically operating or controlling a tandem mass spectrometer between looped mass spectrometry (MS) or mass spectrometry/mass spectrometry (MS/MS) experiments or scans in order to protect the detector from excessive ion current.

In some embodiments methods are provided for dynamically operating or controlling a tandem mass spectrometer between successive looped mass spectrometry (MS) or mass spectrometry/mass spectrometry (MS/MS) experiments or scans in order to extend the quantitative dynamic linear range of the tandem mass spectrometer. In some embodiments systems and methods are provided for dynamically changing the equilibration time between MS scans, MS/MS scans, or MS and MS/MS scans within each cycle time of a plurality of cycle times or between cycles based on a current percentage transmission of ions allowed by a skimmer and a calculated target percentage transmission. By equilibration time, we refer to a time between consecutive scans in which the system is allowed to equilibrate.

In some embodiments a system, method, and computer program product are disclosed for execution by a processor of a tandem mass spectrometer controller in order to dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission. In these embodiments the following operational steps are performed by the tandem mass spectrometer.

A sample is ionized and an ion beam is produced using an ion source. The ion beam is received using a tandem mass spectrometer. The tandem mass spectrometer is configured to perform one or more MS/MS scans or a beginning MS scan and one or more MS/MS scans of the ion beam during each cycle time of a plurality of cycle times.

For a beginning MS scan and/or each MS/MS scan of a plurality of MS/MS scans for each cycle time of the plurality of cycle times a series of steps are performed using a processor.

A previous percentage transmission, a previous TIC of the ion beam, and a previous intensity of the highest mass peak measured for the beginning MS or each MS/MS scan in a previous cycle and a current percentage transmission of the ion beam are received.

A target percentage transmission of the ion beam is calculated based on the previous percentage transmission and the previous TIC or previous intensity.

An equilibration time is calculated based on the current percentage transmission and the target percentage transmission.

A skimmer of the tandem mass spectrometer is controlled to attenuate the ion beam to the target percentage transmission to prevent saturation of a detector of the tandem mass spectrometer and to increase the dynamic range of the tandem mass spectrometer.

The tandem mass spectrometer is controlled to perform the beginning MS scan or an MS/MS scan after the calculated equilibration time to reduce the cycle time.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
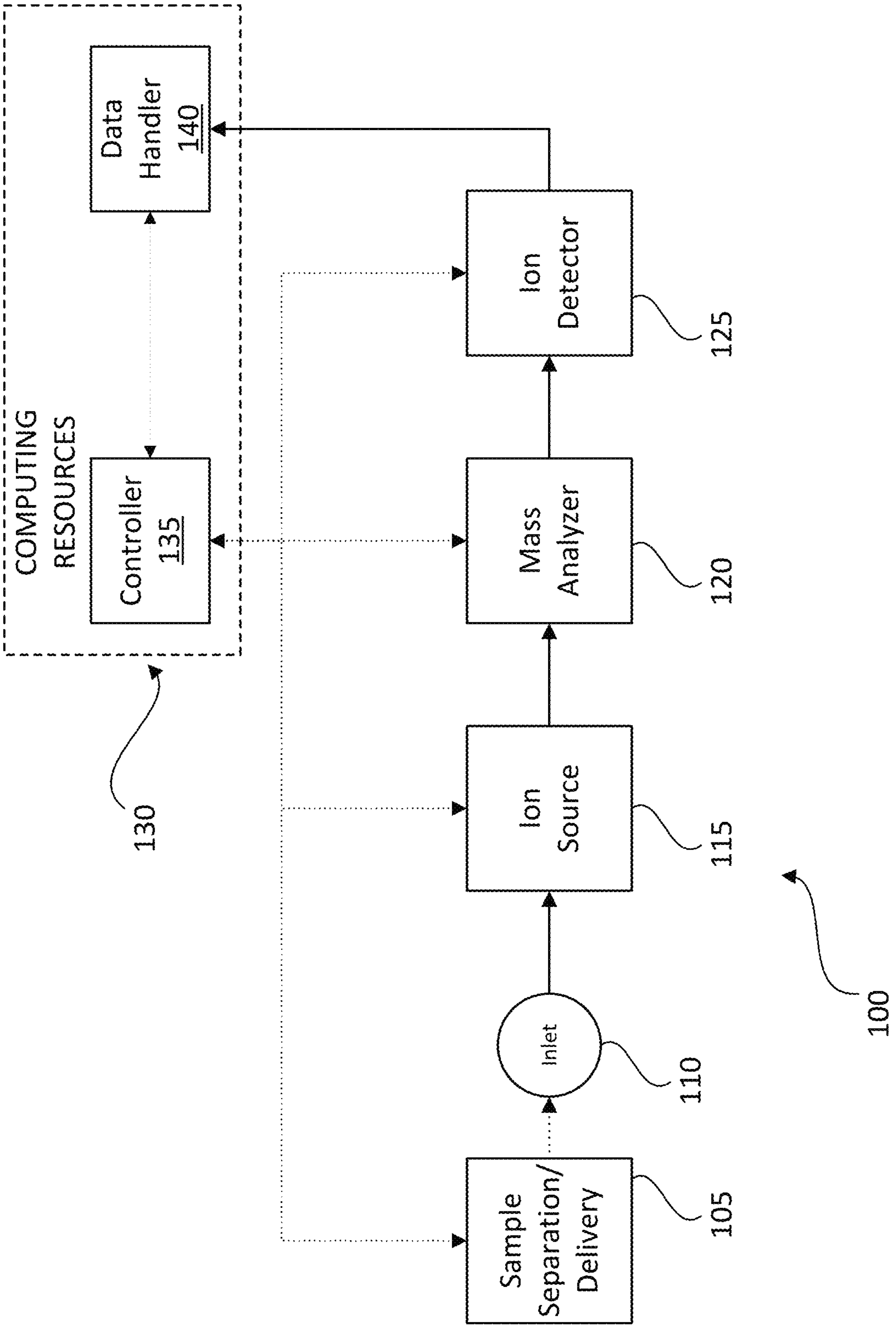
FIG. 1 is a block diagram illustrating embodiments of a mass analysis system.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION

FIG. 1 presents, an exemplary mass analysis instrument 100 according to various embodiments of the present teachings. The mass analysis instrument 100 is an electro-mechanical instrument for separating and detecting ions of interest from a given sample. The mass analysis instrument 100 includes computing resources 130 to carry out both control of the system components and to receive and manage the data generated by the mass analysis instrument 100. In the embodiment of FIG. 1 the computing resources 130 are illustrated as having separate modules: a controller 135 for directing and controlling the system components and a data handler 140 for receiving and assembling a data report of the detected ions of interest. Depending upon requirements the computing resources 130 may comprise more or less modules than those depicted, may be centralized, or may be distributed across the system components depending upon requirements. Typically, the detected ion signal generated by the ion detector 125 is formatted in the form of one or more mass spectra based on control information as well as other process information of the various system components. Subsequent data analysis using a data analyzer (not illustrated in FIG. 1) may subsequently be performed on the data report (e.g. on the mass spectra) in order to interpret the results of the mass analysis performed by the mass analysis instrument 100.

In some embodiments, mass analysis instrument 100 may include some or all of the components as illustrated in FIG. 1. For the purposes of the present application, mass analysis instrument 100 includes at least a mass analyzer 120, ion detector 125 and associated computing resources 130.

In some embodiments, mass analysis instrument 100 may include all of the components illustrated in FIG. 1. In these embodiments the mass analysis instrument 100 includes a separation system 105, such as a liquid chromatograph (LC) column, for separating the components in a sample and delivering the separated components to an inlet 110. The exemplary mass analysis instrument 100 further includes an ion source 115 disposed downstream of the separation system 105 for ionizing at least a portion of the eluting solvent exiting therefrom. A mass analyzer 120 receives the generated ions from the ion source 115 for mass analysis. As discussed in more detail below, in some embodiments, the mass analyzer 120 can be a tandem mass analyzer (e.g., MS/MS). The mass analyzer 120 is operative to selectively separate ions of interest from the generated ions received from the ion source 115 and to fragment the separated ions of interest. An ion detector 125 is operative to detect fragmented ions of interest fragmented by the mass analyzer 120 and to provide a mass spectrometer signal to the data handler 140.

As noted above, the mass analysis instrument 100 includes a sample separation/delivery system 105 for separating components in a sample. The separation system 105 may additionally provide various pre-treatment steps to prepare the sample for mass spectrometric analysis, including by utilizing techniques such as derivatization, for instance. Examples of useful separation systems 105 include, but are not limited to, injection, liquid chromatography, gas chromatography, capillary electrophoresis, or ion mobility.

In an embodiment described herein, the separation system 105 includes an in-line LC column having an input port for receiving a calibration mixture or sample and an output port through which fluid output (effluent) exits the separation system 105. A pump (e.g., an HPLC pump) can drive a mobile phase and a sample mixture into the LC column via its input port. It will be appreciated, however, a pre-treatment/separation system suitable for use in accordance with the present teachings can operate in an off-line or on-line mode. In in-line LC-MS, the effluent exiting the LC column can be continuously subjected to mass spectrometric analysis to generate an extracted ion chromatogram (XIC), which can depict detected ion intensity (a measure of the number of detected ions, or total ion intensity of one or more particular analytes) as a function of retention time.

It will also be appreciated that the ion source 115 for ionizing at least a portion of the calibration mixture or patient sample can have a variety of configurations as is known in the art. Indeed, the ion source 115 can be any known or hereafter developed ion source for generating ions. Non-limiting examples of ion sources suitable for use with the present teachings include atmospheric pressure chemical ionization (APCI) sources, electrospray ionization (ESI) sources, continuous ion source, a glow discharge ion source, a chemical ionization source, or a photo-ionization ion source, among others.

Components of the mass analysis instrument 100 may commonly be referred to as a "mass spectrometer". Conventionally, the combination of the mass analyzer 120 and the ion detector 125 along with relevant components of the controller 135 and the data handler 140 are typically referred to as a mass spectrometer. It will be appreciated, however, that while some of the components may be considered "separate", such as the separation system 105 all the components of a mass analysis instrument 100 operate in coordination in order to analyze a given sample.

Figure 2:
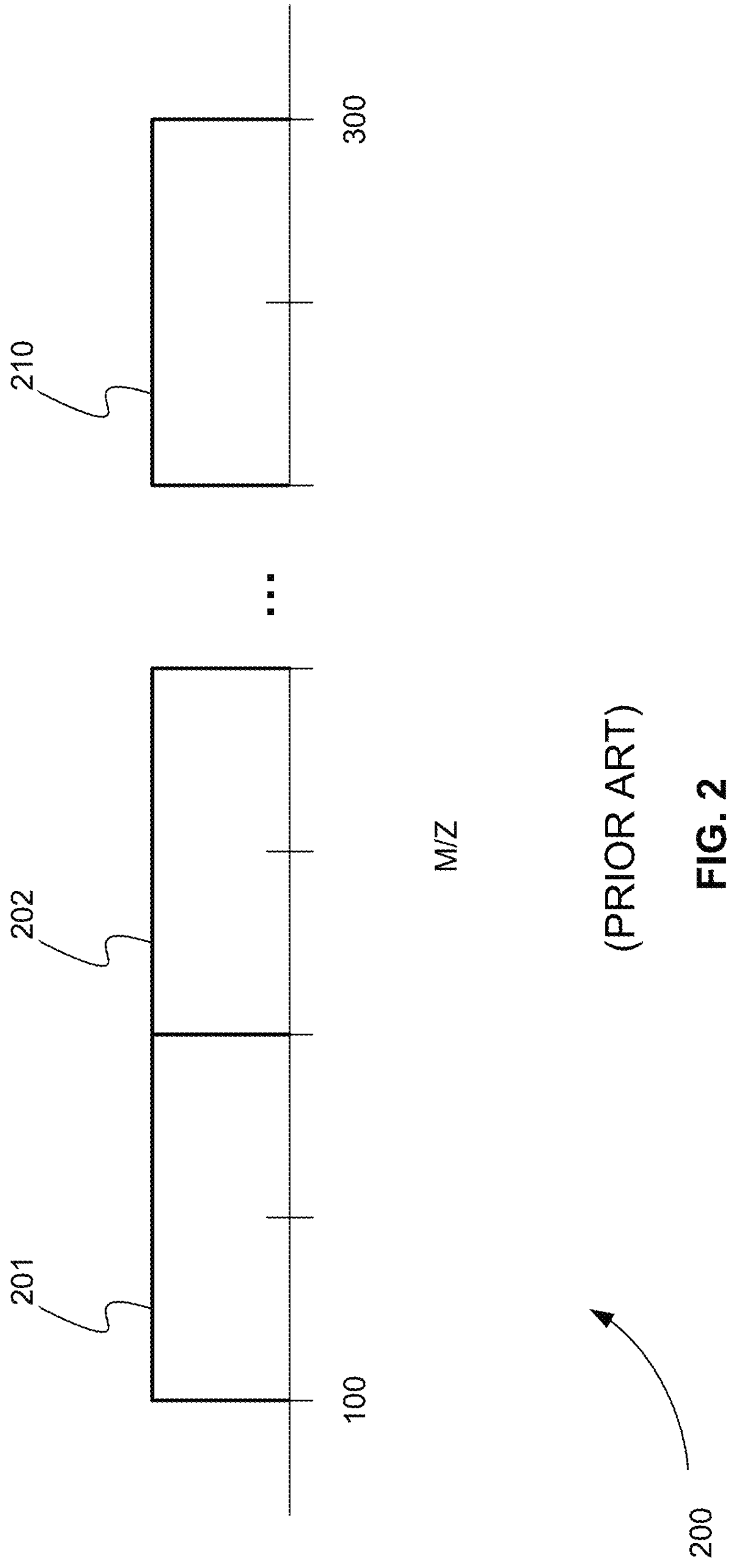
(PRIOR ART) FIG. 2
FIG. 2 is an exemplary diagram of a precursor ion mass-to-charge ratio (m/z) range that is divided into ten precursor ion mass selection windows for a data independent acquisition (DIA) SWATH workflow.

FIG. 2 is an exemplary diagram 200 of a precursor ion mass-to-charge ratio (m/z) range that is divided into ten precursor ion mass selection windows for a data independent acquisition (DIA) SWATH workflow. The m/z range shown in FIG. 2 is 200 m/z. Note that the terms "mass" and "m/z" are used interchangeably herein. Generally, mass spectrometry measurements are made in m/z and converted to mass by multiplying by charge.

In the example of FIG. 2, each of the ten precursor ion mass selection or isolation windows has a width of 20 m/z. For illustrative clarity only three of the ten precursor ion mass selection windows, windows 201, 202, and 210, are shown in FIG. 2. In this example, precursor ion mass selection windows 201, 202, and 210 are shown as non-overlapping windows with the same width. While not shown in FIG. 2, precursor ion mass selection windows can also overlap and/or can have variable widths as may be required.

FIG. 2 depicts non-variable and non-overlapping precursor ion mass selection windows used in a single cycle of an exemplary SWATH acquisition. A tandem mass spectrometer that can perform a SWATH acquisition method can further be coupled with a sample separation/delivery device that separates one or more compounds from the sample over time, for example. As a result, for each time step of a sample introduction of separated compounds, each of the ten precursor ion mass selection windows is selected and then fragmented, producing ten product ion spectra for the entire m/z range. In other words, each of the ten precursor ion mass selection windows is selected and then fragmented during each cycle of a plurality of cycles.

Figure 3:
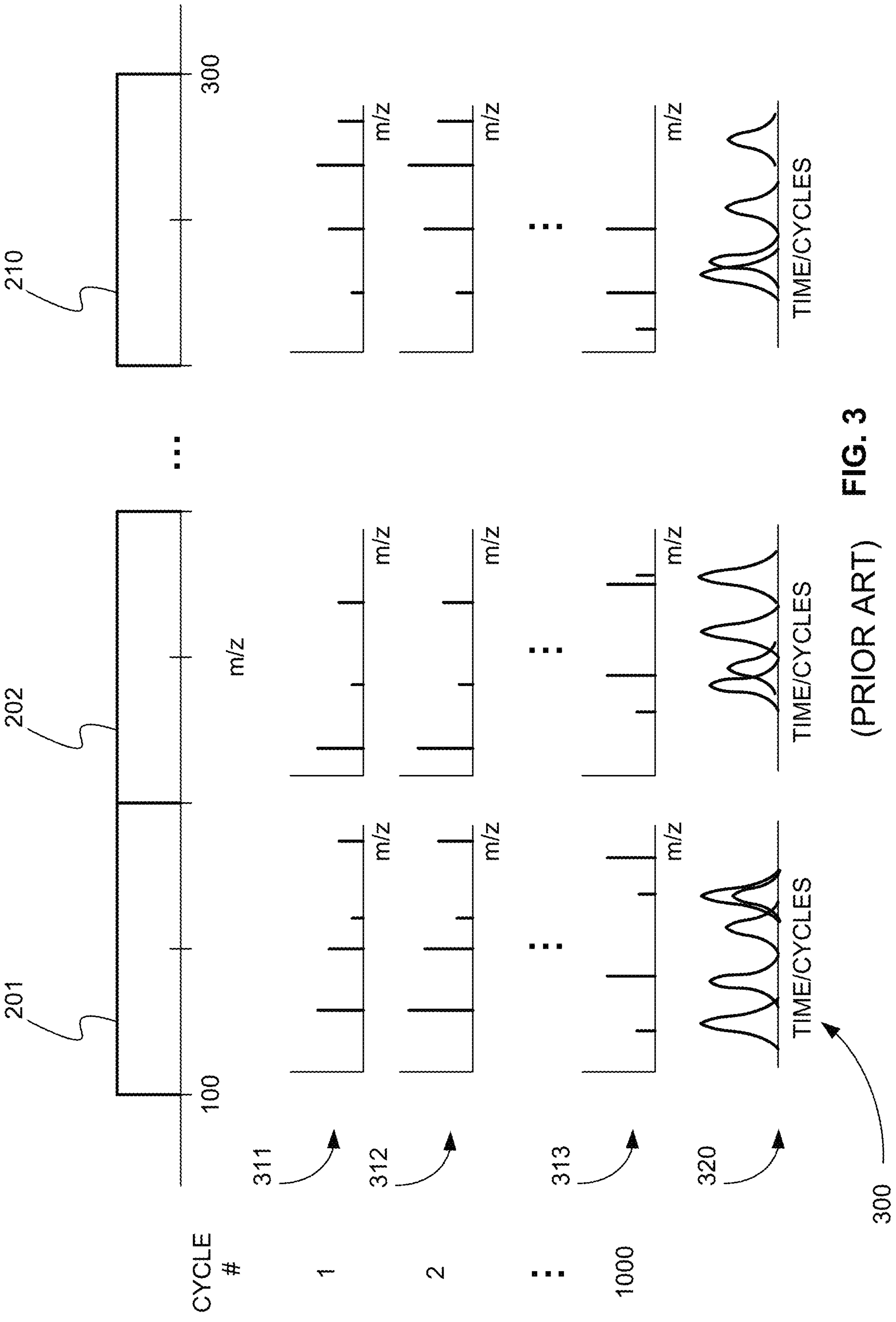
FIG. 3 (PRIOR ART)
FIG. 3 is an exemplary diagram that graphically depicts the steps for obtaining product ion traces or XICs from each precursor ion mass selection window during each cycle of a DIA workflow.

FIG. 3 is an exemplary diagram 300 that graphically depicts the steps for obtaining product ion traces or XICs from each precursor ion mass selection window during each cycle of a DIA workflow. For example, ten precursor ion mass selection windows, represented by precursor ion mass selection windows 201, 202, and 210 in FIG. 3, are selected and fragmented during each cycle of a total of 1000 cycles.

During each cycle, a product ion spectrum is obtained for each precursor ion mass selection window. For example, product ion spectrum 311 is obtained by fragmenting precursor ion mass selection window 201 during cycle 1, product ion spectrum 312 is obtained by fragmenting precursor ion mass selection window 201 during cycle 2, and product ion spectrum 313 is obtained by fragmenting precursor ion mass selection window 201 during cycle 1000.

By evaluating the intensities of the product ions in each product ion spectrum of each precursor ion mass selection window over time, XICs can be calculated for each product ion produced from each precursor ion mass selection window. For example, plot 320 includes the XICs calculated for each product ion of the 1000 product ion spectra of precursor ion mass selection window 201. Note that XICs can be plotted in terms of time or cycles depending upon requirements.

The XICs in plot 320 are shown plotted in two dimensions in FIG. 3. However, each XIC is actually three-dimensional, because the different XICs are calculated for different m/z values.

Figure 4:
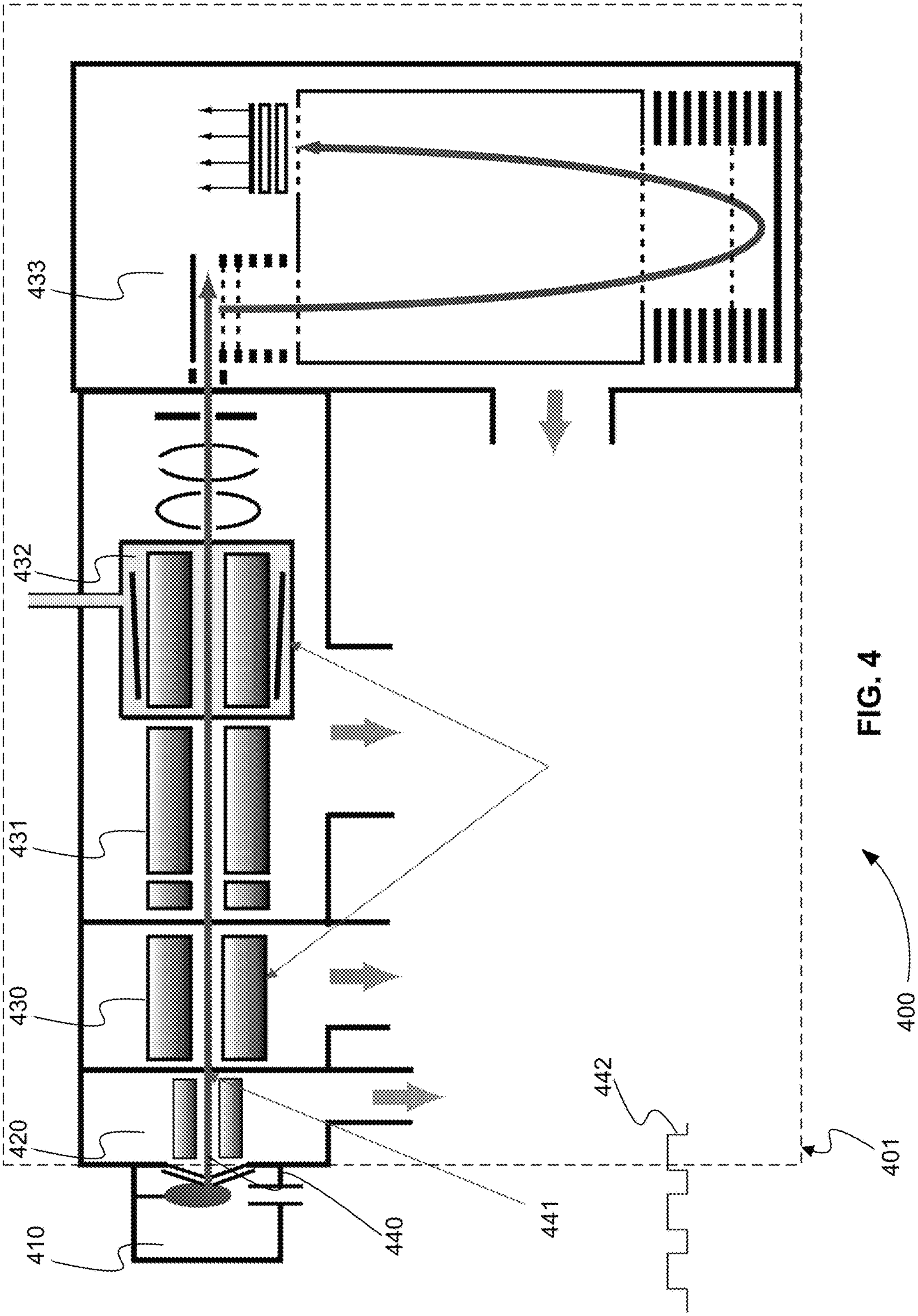
FIG. 4 is an exemplary system showing how a tandem mass spectrometer is controlled to perform dynamic skimmer pulsing and use dynamic equilibration times, in accordance with various embodiments.

FIG. 4 is a simplified schematic of an exemplary system 400 showing how a tandem mass spectrometer may be controlled to perform dynamic skimmer pulsing. For simplicity of illustration, the schematic of FIG. 4 does not include associated components such as the computing resources 130 and sample separation/delivery system 105 as illustrated in FIG. 1. System 400 includes tandem mass spectrometer 401. Tandem mass spectrometer 401 includes, for example, ion source 410, skimmer 420, non-resolving or $Q_0$ quadruple 430, mass filter or $Q_1$ quadruple 431, fragmentation device or $Q_2$ quadruple 432, and mass analyzer 433, which may be a time-of-flight (TOF) device or other known mass analysis instrument as meets the analysis requirements.

Ion source 410 is configured to ionize a sample and produce a continuous ion beam 440. Tandem mass spectrometer 401 receives ion beam 440 from ion source 410.

Skimmer 420 of tandem mass spectrometer 401 is configured to attenuate ion beam 440. For example, Skimmer 420 is configured to attenuate ion beam 440 with use of a gating or pulsing lens 441. Lens 441 can be, but is not limited to, an $IQ_0$ lens. A controller (not shown in FIG. 4) may apply a varying voltage to the lens 441 in order to pulse the gating action of the lens 441 using one or more voltage sources (not shown). Conveniently the varied voltage may be applied in the form of a square wave 442, alternating between two binary states such as an "on" state and an "off" state. When square wave 442 is on, all ions of ion beam 440 are transmitted to $Q_0$ 430 and when square wave 442 is off, no ions are transmitted to $Q_0$ 430. The ratio of on pulses to off pulses of square wave 442, therefore, determines the percentage transmission of ion beam 440 received by $Q_0$ 430. Specifically, the percentage transmission of ion beam 440 received by $Q_0$ 430 is the ratio of on time to the total of on and off time.

Mass filter 431 is configured to select one or more precursor ions of the attenuated ion beam 440 or select all of the precursor ions of the attenuated ion beam 440. Fragmentation device 432 is configured to transport, for an MS scan, or fragment, for an MS/MS scan the selected one or more precursor ions from ion beam 440. Mass analyzer 433 is configured to mass analyze the transported one or more precursor ions, for an MS scan, or to mass analyze one or more product ions fragmented from the selected one or more precursor ions, for an MS/MS scan.

Typically, tandem mass spectrometer 401 may be configured to perform a number of scans during each cycle time of a plurality of cycle times. The cycle times can be, but are not limited to, the cycle times of a sample separation process, such as liquid chromatography (LC). For an IDA acquisition method, the tandem mass spectrometer may be configured to perform a beginning MS scan and one or more MS/MS scans of the ion beam during each cycle time of the plurality of cycle times, for example. For a DIA acquisition method, the tandem mass spectrometer may be configured to perform one or more MS/MS scans of the ion beam during each cycle time of the plurality of cycle times, for example.

Dynamic skimmer pulsing has been used on MS-TOF tandem mass spectrometers to protect the TOF detector from excessive ion current during MS scans as well as to extend the quantitative linear dynamic range of the MS scan acquisition. Dynamic skimmer pulsing can also be referred to as dynamic ion transmission control (ITC). The term "dynamic" refers to the fact that the skimmer pulsing for an MS scan is automatically calculated and changed on the fly based on variables measured for the MS scan in the previous cycle. The variables measured from the MS scan in the previous cycle include the total ion current (TIC) of the ion beam and an intensity of the highest precursor ion mass peak measured. Whenever the TIC of the ion beam from the previous MS scan cycle reaches a predetermined saturation threshold or the intensity of the highest precursor ion mass peak of the MS scan, i.e. the highest detected ion current value, in the previous cycle is near or reaches a predetermined saturation threshold, a new or target percentage transmission of ion beam 440 is calculated and the square wave 442 is changed to attenuate ion beam 440 according to the calculated target percentage transmission.

The target percentage transmission of ion beam 440 for the current cycle is calculated from the previous percentage transmission of ion beam 440, the previous measure TIC of the MS scan, and the previous intensity of the highest precursor ion mass peak of the MS scan in the previous cycle.

Figure 5:
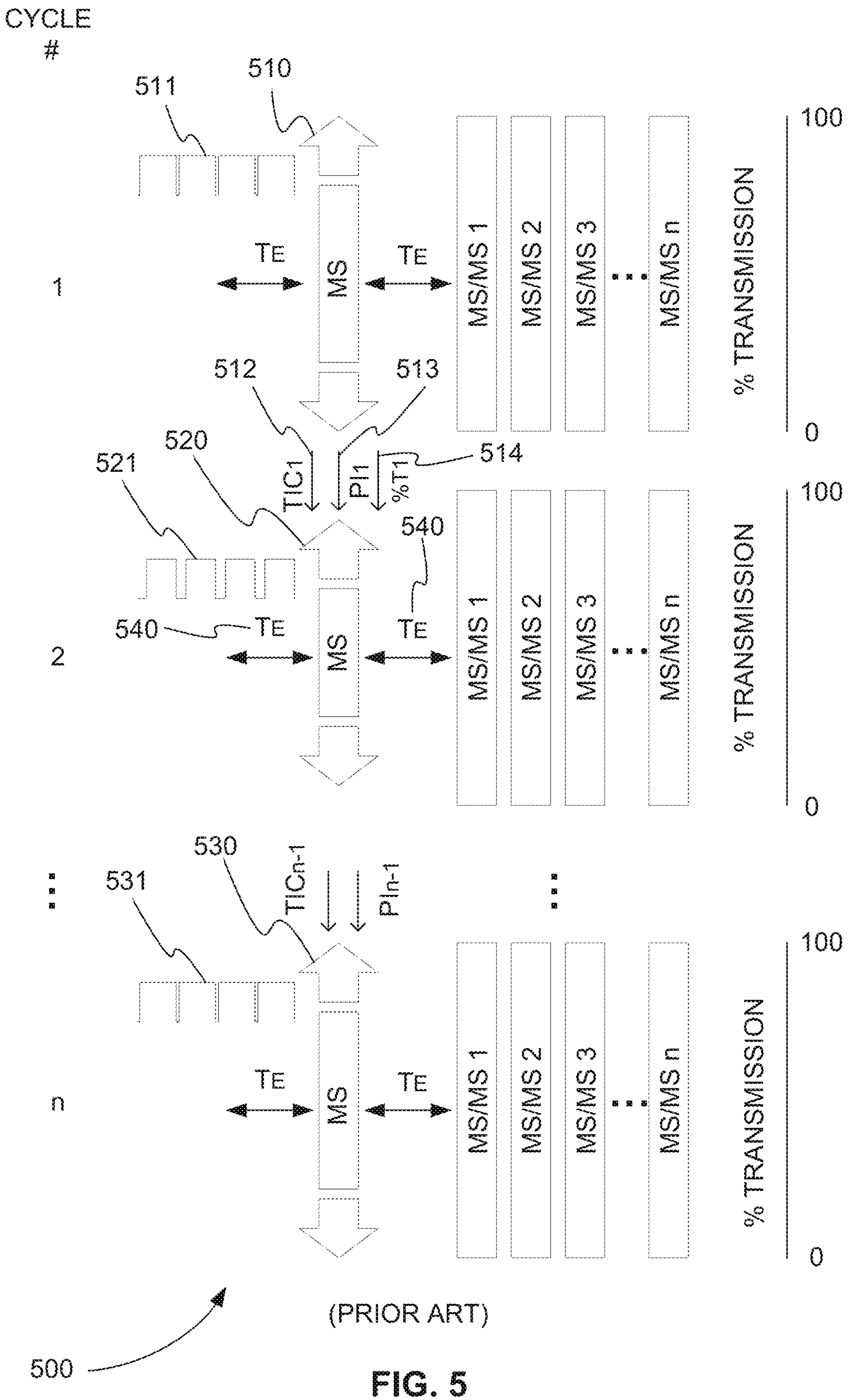
(PRIOR ART) FIG. 5
FIG. 5 is an exemplary diagram showing the change in the transmission of the ion beam of an MS scan from cycle to cycle produced by dynamic skimmer pulsing.

FIG. 5 is an exemplary diagram 500 showing the change in the transmission of the ion beam of an MS scan from cycle to cycle produced by dynamic skimmer pulsing. For example, in cycle 1, the percentage of transmission 510 of the ion beam of the MS scan is almost 100%. In other words, in cycle 1, the ion beam of the MS scan is not attenuated at all. The skimmer pulsing 511 is essentially always on. In contrast, in cycle 2, the percentage of transmission 520 of the ion beam of the MS scan is less than 100% due to a change in the dynamic skimmer pulsing. The skimmer pulsing 521 is now off for a longer period of time. Skimmer pulsing 521 was determined from the previous percentage transmission in cycle 1 (almost 100%) and from a new or current percentage of transmission calculated from $TIC_1$ 512 of the MS scan in cycle 1 or from the intensity of the highest precursor ion mass peak of the MS scan $PI_1$ 513 in cycle 1 measured by the detector of the tandem mass spectrometer.

For example, in cycle 1, $TIC_1$ 512 of the MS scan could have been near, at, or above a threshold TIC value. If $TIC_1$ 512 is at the threshold TIC value, for example, dynamic skimmer pulsing can reduce the percentage transmission of the in the current cycle (cycle 2) by a pre-determined amount or factor. For instance the system may be operative to reduce the percentage transmission of a current signal by 1% based on the previous percentage transmission. To do this, the system must know the previous percentage transmission in cycle 1. Like the $TIC_1$ 512 and $PI_1$ 513, the percentage transmission of each cycle may be stored in a memory store of the system. These values may be retrieved from the memory store in subsequent cycles. After retrieving the previous percentage transmission, calculating the target percentage transmission is a matter of reducing the previous percentage transmission value by the pre-determined factor. In this example, the current target percentage transmission would be 99% of the previous percentage transmission value retrieved from the memory store. Skimmer pulsing 521, i.e. the percentage "on" state of the lens, is then calculated to produce the target percentage transmission of the ion beam.

Typically, as the TIC measured by the detector increases, the percentage of transmission of the ion beam allowed by the skimmer is decreased (i.e. attenuated). Similarly, as the TIC measured by the detector decreases, the percentage of transmission of the ion beam allowed by the skimmer is increased. As a result, in cycle n, the percentage of transmission 530 of the ion beam of the MS scan is back to almost 100%. The skimmer pulsing 531 is essentially back to an always on condition with no/minimal attenuation of the ion beam.

Figure 6:
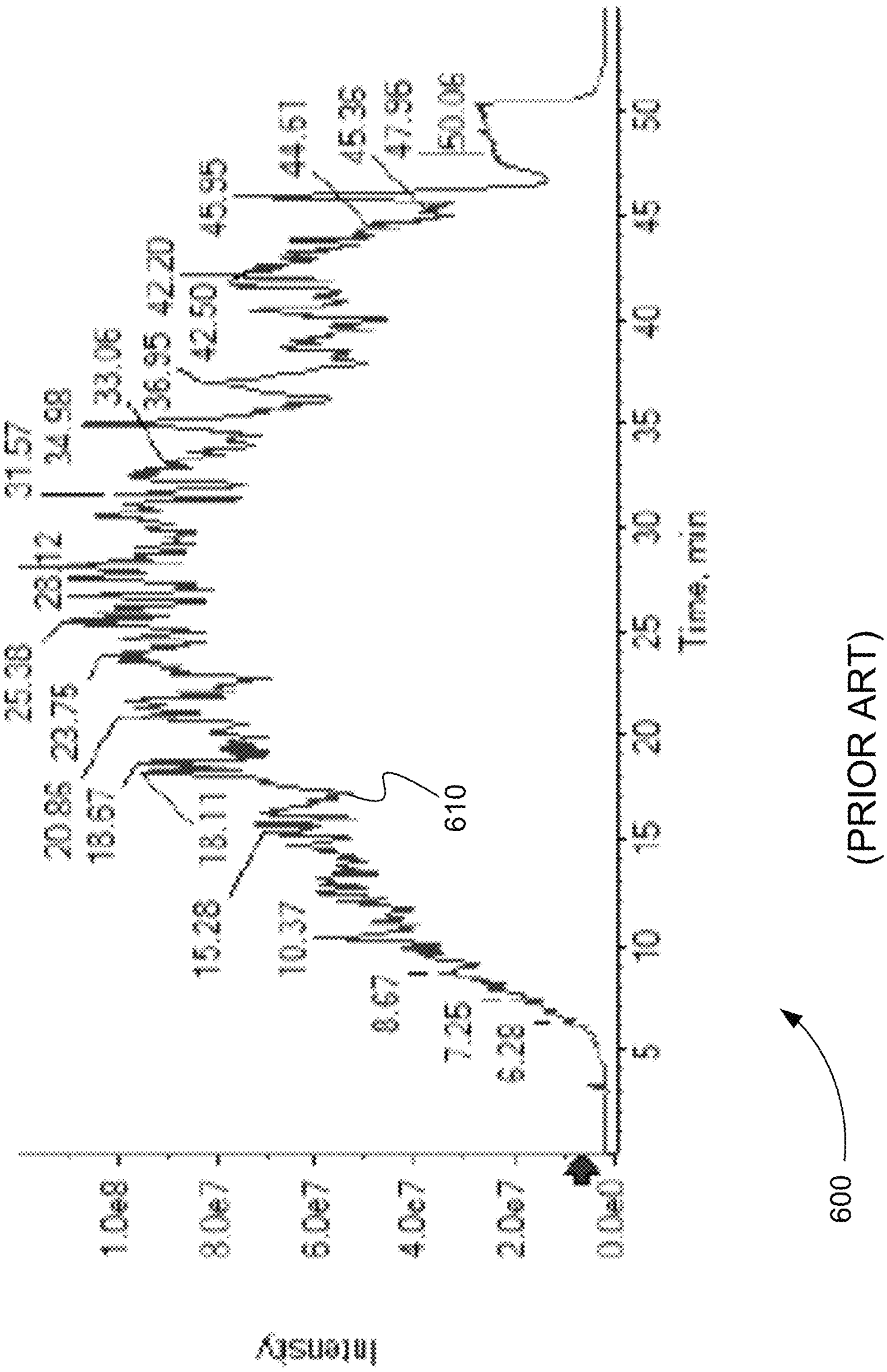
(PRIOR ART) FIG. 6
FIG. 6 is an exemplary plot showing the TIC of the MS scans over time as measured by the detector of the tandem mass spectrometer that uses dynamic skimmer pulsing.

FIG. 6 is an exemplary plot 600 showing the TIC of MS scans over time as measured by the detector of a tandem mass spectrometer that uses dynamic skimmer pulsing. Plot 600 shows, in this example, that TIC 610 increases and then decreases.

Figure 7:
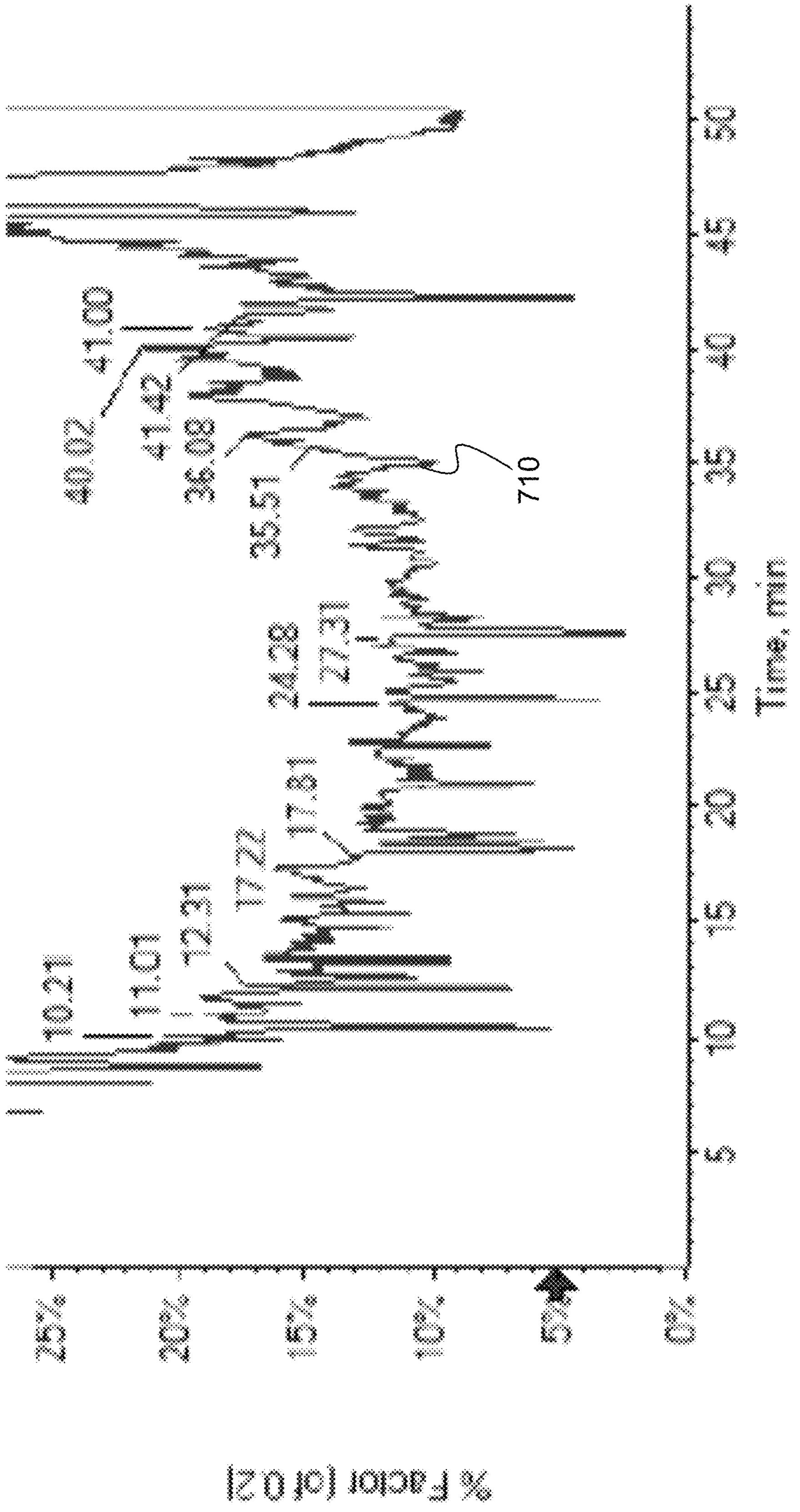
(PRIOR ART) FIG. 7
FIG. 7 is an exemplary plot showing the percentage of transmission of the ion beam of the MS scans of FIG. 6 over time due to dynamic skimmer pulsing.

FIG. 7 is an exemplary plot 700 showing the percentage of transmission of the ion beam of the MS scans of FIG. 6 over time due to dynamic skimmer pulsing. A comparison of plots 600 and 700 shows the percentage of transmission 710 of the ion beam decreases as the TIC 610 increases and the percentage of transmission 710 of the ion beam increases as the TIC 610 decreases. In this fashion the lens of the skimmer allows full passage of the ion beam when the underlying signal (i.e ion fragments to be detected) is low, and progressively attenuates the ion bean as the underlying signal increases. Accordingly, the mass spectrometer may operate at full sensitivity when the underlying signal is low, but the sensitivity is reduced as the underlying signal increases to avoid saturation at the detector. In other words, a comparison of plots 600 and 700 shows that dynamic skimmer pulsing is able to protect the tandem mass spectrometer detector from excessive ion current during MS scans as well as to extend the quantitative linear dynamic range of the MS scan acquisition.

Dynamic skimmer pulsing has only been used in conjunction with MS scans due to the time it takes to equilibrate or re-equilibrate the ion path of the tandem mass spectrometer after the ratio of on to off times of the skimmer has been changed. In other words, the TIC of the ion beam does not immediately change throughout the entire ion path of the mass spectrometer when the skimmer pulsing is changed. Instead, it takes a certain amount of time for the TIC of the ion beam to equilibrate or settle to a new higher or lower value. This time is referred to as the equilibration time or the settling time.

For dynamic skimmer pulsing of MS scans, an equilibration time of about 25 ms has been determined empirically as being a typical time for the ion beam to settle when skimmer pulsing is being changed. This equilibration time has successfully been used to equilibrate the ion beam after the skimmer pulsing is changed and before the MS scan data acquisition is performed in a number of commercial instruments. The same equilibration time of about 25 ms is also used to equilibrate the ion beam after the skimmer pulsing is changed for the first MS/MS scan and before the first MS/MS scan is performed. As a result, for each MS scan that includes dynamic skimmer pulsing, there currently is typically a 50 ms time delay or overhead that is required. Persons of skill in the art will appreciate that the exact equilibration time may vary between instruments, and the example of 25 ms is intended as a non-limiting example for illustrative purposes only. The specific equilibration time required to accommodate changes in ion beam current due to dynamic skimmer pulsing will, at least in part, be depending upon the particular make and model of mass spectrometer instrument.

Returning to FIG. 5, for example, for dynamic skimmer pulsing of MS scans, an equilibration time TE 540 is used to equilibrate the ion beam after the skimmer pulsing is changed and before the MS scan data acquisition is performed. The same equilibration time TE 540 is also used to equilibrate the ion beam after the skimmer pulsing is changed for the first MS/MS scan and before the first MS/MS scan is performed. The skimmer pulsing is changed for the first MS/MS because the percentage of transmission of the ion beam for all MS/MS is set to a fixed value of 100% or close to 100%.

Since there is only one MS scan per cycle, the overhead required for MS scans with dynamic skimmer pulsing is acceptable. In contrast, there are typically on the order of tens of MS/MS scans per cycle. The overhead for performing MS/MS scans with dynamic skimmer pulsing would, therefore, be multiplied tens of times. As a result, it has been understood in the tandem mass spectrometry field that performing MS/MS scans with dynamic skimmer pulsing is not practical. Also, each MS/MS scan of a cycle is only on the order of 25 ms, so the overhead for performing dynamic skimmer pulsing with an MS/MS scan is, at least, 100% of each MS/MS scan time.

Further, it has been understood in the tandem mass spectrometry field that performing MS/MS scans with dynamic skimmer pulsing is usually not necessary because it has been thought that the mass filtering performed in a typical MS/MS scan significantly reduces the ion current received by the detector. In other words, it is highly unlikely that the TIC of MS/MS scans in IDA acquisition methods would saturate the detector of a tandem mass spectrometer, because in these scans typically just one precursor ion is being selected.

Still, however, it is known that certain MS/MS scans could be improved in terms of linear dynamic range if dynamic skimmer pulsing can be used. For example, when the precursor ion selected in an MS/MS scan is particularly intense, dynamic skimmer pulsing can be used to more accurately quantitate the precursor ion. Also, in the MS/MS scans of a DIA method like SWATH, more than one precursor ion is being selected so TIC can cause saturation of the detector of a tandem mass spectrometer. As a result, additional systems and methods are needed to reduce the equilibration time delay of dynamic skimmer pulsing so that dynamic skimmer pulsing can be used with MS/MS scans as well as with MS scans.

Dynamic Equilibration Time with Dynamic Skimmer Pulsing

As described above, dynamic skimmer pulsing has been used in tandem mass spectrometry to protect the detector of a tandem mass spectrometer from excessive ion current during mass spectrometry (MS) scans as well as to extend the quantitative linear dynamic range of the MS scan acquisition. Dynamic skimmer pulsing has only been used in conjunction with MS scans due to the time it takes to equilibrate the ion path of the tandem mass spectrometer after the ratio of on to off times of the skimmer has been changed.

For dynamic skimmer pulsing of MS scans, an equilibration time of about 25 ms has been used to equilibrate the ion beam after the skimmer pulsing is changed and before the MS scan data acquisition is performed. The same equilibration time of about 25 ms is also used to equilibrate the ion beam after the skimmer pulsing is changed for the first mass spectrometry/mass spectrometry (MS/MS) scan and before the first MS/MS scan is performed. As a result, for each MS scan that includes dynamic skimmer pulsing, there is typically a 50 ms time delay or overhead that is required.

Since there is only one MS scan per cycle, the overhead required for MS scans with dynamic skimmer pulsing is acceptable. In contrast, there are typically on the order of tens of MS/MS scans per cycle. The overhead for performing MS/MS scans with dynamic skimmer pulsing would, therefore, be multiplied tens of times. As a result, it has been understood in the tandem mass spectrometry field that performing MS/MS scans with dynamic skimmer pulsing is not practical. Also, each MS/MS scan of a cycle is only on the order of 25 ms, so the overhead for performing dynamic skimmer pulsing with an MS/MS scan is, at least, 100% of each MS/MS scan time.

Further, it has been understood in the tandem mass spectrometry field that performing MS/MS scans with dynamic skimmer pulsing is usually not necessary because it has been thought that the mass filtering performed in a typical MS/MS scan significantly reduces the ion current received by the detector. In other words, it is highly unlikely that the total ion current (TIC) of MS/MS scans would saturate the detector of a tandem mass spectrometer, because in these scans typically just one precursor ion is being selected.

Still, however, it is known that certain MS/MS scans could be improved in terms of linear dynamic range if dynamic skimmer pulsing can be used. For example, when the precursor ion selected in an MS/MS scan is particularly intense, dynamic skimmer pulsing can be used to more accurately quantitate the precursor ion. Also, in the MS/MS scans of a DIA method like SWATH, more than one precursor ion is being selected so TIC can cause saturation of the detector of a tandem mass spectrometer. As a result, additional systems and methods are needed to reduce the equilibration time delay of dynamic skimmer pulsing so that dynamic skimmer pulsing can be used with MS/MS scans as well as with MS scans.

In various embodiments, the equilibration time delay or overhead of dynamic skimmer pulsing is reduced by calculating and using a dynamic equilibration time for each MS or MS/MS scan based on the change in skimmer pulsing between scans and based on the current measured TIC. In other words, dynamic skimmer pulsing for MS/MS scans is made possible by also calculating and using dynamic equilibration times.

Returning to FIG. 4, in some embodiments system 400 can further be used for dynamically changing the required equilibration time between MS/MS scans or between MS and MS/MS scans of a tandem mass spectrometer within each cycle time of a plurality of cycle times or between adjacent cycles based on a calculated target percentage transmission and the current percentage transmission. In these embodiments, tandem mass spectrometer 401 includes, for example, ion source 410, skimmer 420, $Q_0$ quadruple 430, mass filter 431, fragmentation device 432, and mass analyzer 433.

In various embodiments, tandem mass spectrometer 401 can further include a sample separation/delivery device (not shown in FIG. 4). The sample separation/delivery device introduces one or more compounds of interest from a sample to ion source 410 over time, for example. The sample separation/delivery device can perform techniques that include, but are not limited to, injection, liquid chromatography, gas chromatography, capillary electrophoresis, or ion mobility.

Ion source 410 is configured to ionize a sample and produce a continuous ion beam 440. Ion source 410 can perform ionization techniques that include, but are not limited to, matrix assisted laser desorption/ionization (MALDI) or electrospray ionization (ESI).

Tandem mass spectrometer 401 receives ion beam 440 from ion source 410. Tandem mass spectrometer 401 and ion source 410 are shown as separate components of a mass analysis instruments. However, in some embodiments ion source 410 can also be a part of the tandem mass spectrometer 401.

Skimmer 420 of tandem mass spectrometer 401 is configured to attenuate ion beam 440. For example, Skimmer 420 is configured to attenuate ion beam 440 by gating or pulsing lens 441. Lens 441 is pulsed, for example, by applying a square wave 442 to the lens 441 as described above.

Mass filter 431 is configured to select one or more precursor ions of the attenuated ion beam 440. Mass filter 431 is shown as quadrupole. However, mass filter 431 can be any type of mass filter.

Fragmentation device 432 is configured to transport, for an MS scan, or fragment, for an MS/MS scan the selected one or more precursor ions from ion beam 440. Fragmentation device 432 is shown as quadrupole collision cell. However, fragmentation device 432 can be any type of fragmentation device.

Mass analyzer 433 is configured to mass analyze the transported one or more precursor ions, for an MS scan, or to mass analyze one or more product ions fragmented from the selected one or more precursor ions, for an MS/MS scan. Mass analyzer 433 is shown as time-of-flight (TOF) device. However, mass analyzer 433 can be any type of mass analyzer. A mass analyzer of a tandem mass spectrometer can include, but is not limited to, a TOF device, a quadrupole, an ion trap, a linear ion trap, an orbitrap, a magnetic four-sector mass analyzer, or a Fourier transform mass analyzer.

$Q_0$ quadruple 430, mass filter 431, fragmentation device 432, and mass analyzer 433 are shown in FIG. 4 as separate devices or stages of tandem mass spectrometer 401. In various embodiments, two or more of these devices can be combined in a single device or stage.

Typically, tandem mass spectrometer 401 is configured to perform a number of scans during each cycle time of a plurality of cycle times. The cycle times can be, but are not limited to, the cycle times of a sample separation/delivery device.

The system further includes a controller and associated processor (not shown) in communication with the ion source 410 and the tandem mass spectrometer 401. The processor can be, but is not limited to, the system of FIG. 11, a computer, microprocessor, microcontroller, or any device capable of sending and receiving control signals and data to and from ion source 410, tandem mass spectrometer 401, and other devices. The processor further can have access to one or more memory devices, like the system of FIG. 11.

The processor performs a number of steps for a beginning MS scan and each MS/MS scan of a plurality of MS/MS scans for each cycle of a plurality of cycle times or for each MS/MS scan of a plurality of MS/MS scans for each cycle of a plurality of cycle times. For example, the processor performs a number of steps for a beginning MS scan and each MS/MS scan of a plurality of MS/MS scans for each cycle of a plurality of cycle times for an IDA acquisition method. The processor performs a number of steps for each MS/MS scan of a plurality of MS/MS scans for each cycle of a plurality of cycle times for a DIA acquisition method.

In a first step, the processor receives a previous percentage transmission of ion beam 440, a previous TIC of ion beam 440, and a previous intensity of the highest mass peak measured for the beginning MS or each MS/MS scan in the previous cycle and a current percentage transmission of ion beam 440. The previous percentage transmission, previous TIC, and the previous intensity of the highest mass peak measured can be received from a memory device (not shown), for example. The current percentage transmission of ion beam 440 can also be received from a memory device (not shown), for example.

In a second step, the processor calculates a target percentage transmission of ion beam 440 based on the previous percentage transmission and the previous TIC or previous intensity. As described above, whenever the TIC of a scan in the previous cycle reaches a predetermined saturation threshold or the intensity of the highest ion mass peak of the scan in the previous cycle reaches a predetermined saturation threshold, a new or target percentage transmission of ion beam 440 is calculated and square wave 442 is changed to attenuate ion beam 440 according to the calculated target percentage transmission. This is now done for MS/MS scans as well as MS scans. For MS/MS scans, the intensity of the highest ion mass peak is an intensity of a product ion peak.

In a third step, the processor calculates an equilibration time based on the current percentage transmission and the calculated target percentage transmission. It was observed that the time required to equilibrate the ion path to a different TIC depends on the magnitude and direction of the TIC. For example, it takes considerably less time to increase the ion current in the ion path following an increase in ITC than it does to decrease it. From the difference between the current percentage transmission and the calculated target percentage transmission, the magnitude and direction of the change in the TIC are determined.

The equilibration time can be calculated from the current percentage transmission and the calculated target percentage transmission in a variety of different ways including, but not limited to, using a set of rules, using a lookup table, using an equilibration time curve, or using a mathematical function. The equilibration time curve is, for example, a function of the current percentage transmission and the target percentage transmission that is plotted from previous experimental data. The mathematical function is also, for example, determined from previous experimental data.

A very simple set of rules can include, for example, selecting one of two equilibration times based on the direction of the TIC. If the calculated target percentage transmission is less than the current percentage transmission, then the TIC is being decreased. The equilibration time for a decrease in TIC is set to 20 ms. If the calculated target percentage transmission is greater than the current percentage transmission, then the TIC is being increased. As described above, it takes considerably less time to increase the ion current in the ion path following an increase in ITC than it does to decrease it. As a result, the equilibration time for an increase in TIC is set to 8 ms.

A set of rules can be much more complex using many more possible equilibration times based on exact differences between the current percentage transmission and the target percentage transmission. Similarly, simple or complex equilibration times can be found using a lookup table, using an equilibration time curve, or using a mathematical function.

In a fourth step, the processor controls skimmer 420 to attenuate ion beam 440 to the target percentage transmission.

In a fifth step, the processor controls tandem mass spectrometer 401 to perform the beginning MS scan or an MS/MS scan after the calculated equilibration time to reduce the cycle time.

In various embodiments, after the calculated equilibration time, the processor controls $Q_0$ 430, the mass filter 431, fragmentation device 432, and mass analyzer 433 to focus, filter, transport or fragment, and mass analyze ions of ion beam 440, respectively, for the beginning MS or each MS/MS scan. The calculated target percentage transmission prevents saturation and increases linear dynamic range. The calculated equilibration time reduces the overall time of the cycle.

Figure 8:
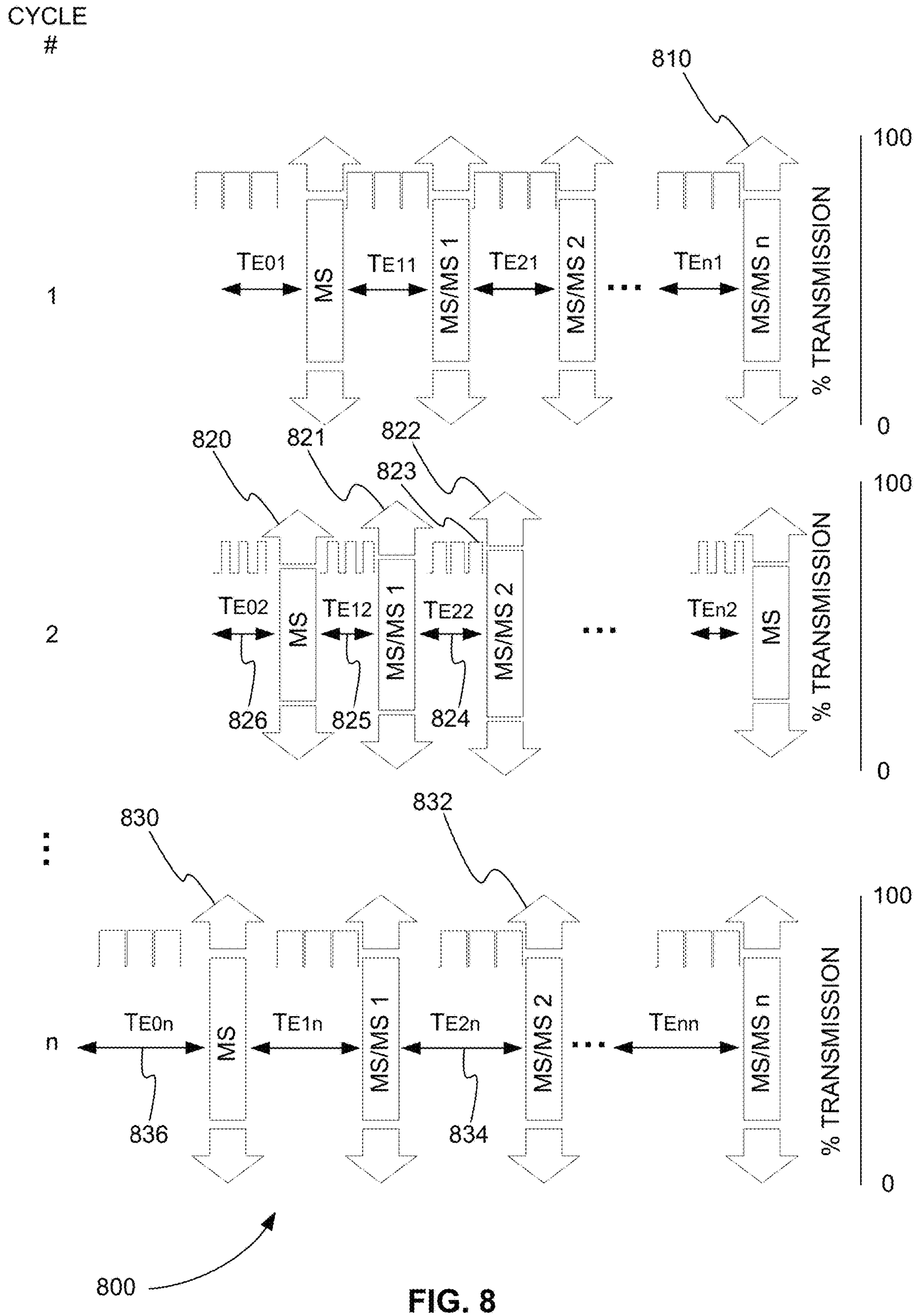
FIG. 8 is an exemplary diagram showing the change in the transmission of the ion beam of a beginning MS scan and one or more MS/MS scans from cycle to cycle produced by dynamic skimmer pulsing followed by dynamic equilibration times, in accordance with various embodiments.

FIG. 8 is an exemplary diagram 800 showing the change in the transmission of the ion beam of a beginning MS scan and one or more MS/MS scans from cycle to cycle produced by dynamic skimmer pulsing followed by dynamic equilibration times, in accordance with various embodiments. A comparison of FIG. 5 with FIG. 8 shows two primary differences between the conventional method of FIG. 5 and the new embodiment of FIG. 8.

The first difference is that, within each cycle, dynamic skimmer pulsing and dynamic equilibration times are used between MS/MS scans and dynamic equilibration times are now used between a beginning MS scan and an MS/MS scan. For example, dynamic skimmer pulsing 823 and dynamic equilibration time $T_{E22}$ 824 are used between MS/MS 1 scan 821 and MS/MS 2 scan 822. Also, for example, dynamic equilibration time $T_{E12}$ 825 is now used between beginning MS scan 820 and MS/MS 1 scan 821.

The second difference is that equilibration times are now dynamic, so, between cycles, the equilibration times for the beginning MS scan and each MS/MS scan can vary. For example, equilibration time $T_{E02}$ 826 for beginning MS scan 820 in cycle 2 is different from equilibration time $T_{E0n}$ 836 for beginning MS scan 820 in cycle n. Similarly, for example, equilibration time $T_{E22}$ 824 for MS/MS 2 scan 822 in cycle 2 is different from equilibration time $T_{E2n}$ 834 for MS/MS 2 scan 832 in cycle n.

Note that equilibration times are also calculated between cycles. For example, equilibration time $T_{E02}$ 826 for beginning MS scan 820 in cycle 2 is actually the equilibration time between MS/MS n 810 scan in cycle 1 and beginning MS scan 820 in cycle 2. As a result, equilibration time $T_{E02}$ 826 is calculated based on the current percentage transmission of MS/MS n 810 scan in cycle 1.

Essentially, in various embodiments, dynamic skimmer pulsing and dynamic equilibration times are used between all scans within a cycle and between scans across cycles. Equilibration times for a next scan are changed based on the observed percentage transmission of the ion current in the current scan.

Method for Dynamically Changing the Equilibration Time

Figure 9:
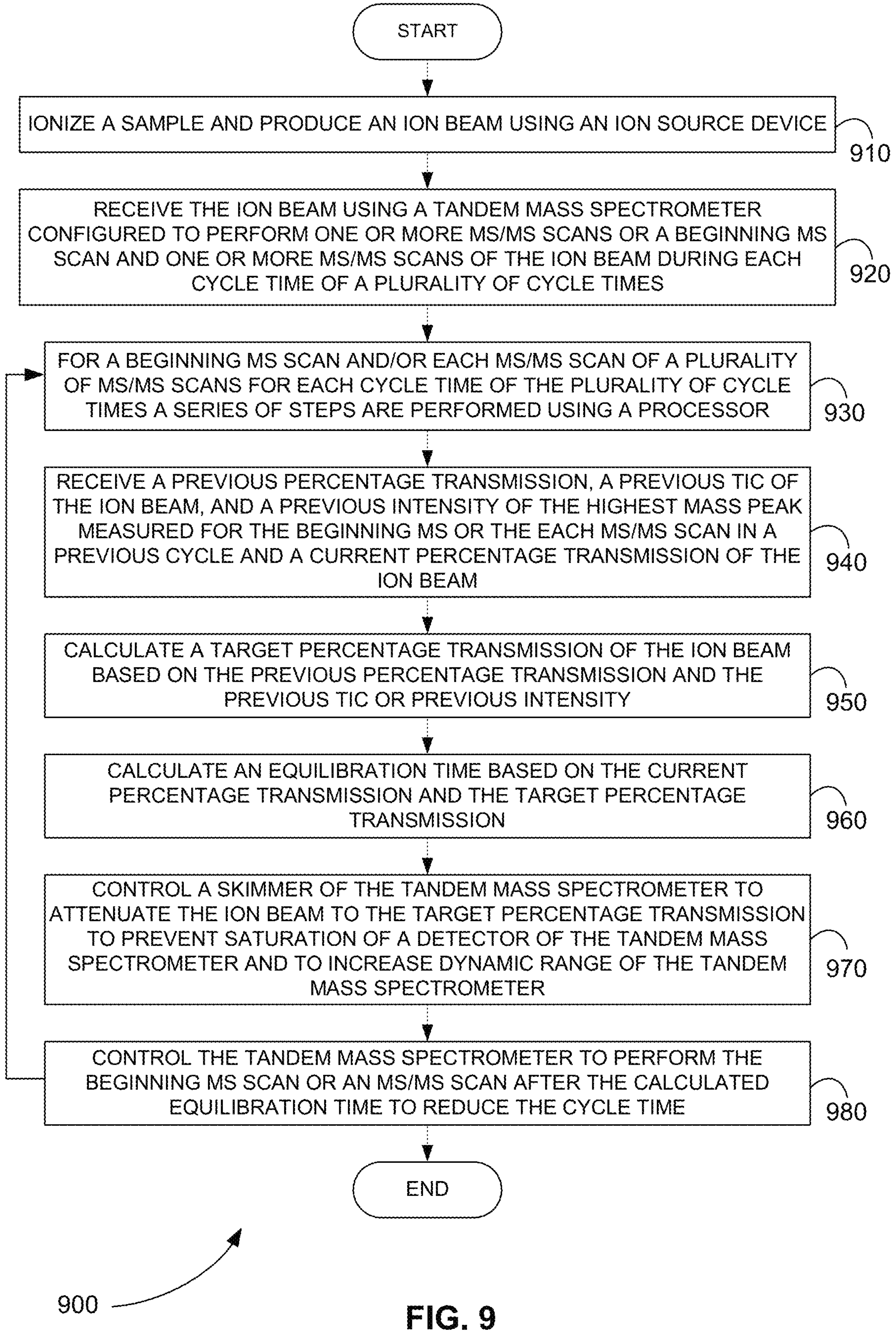
FIG. 9 is a flowchart showing a method for dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission, in accordance with various embodiments.

FIG. 9 is a flowchart showing a method 900 for dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission, in accordance with various embodiments.

In step 910 of method 900, a sample is ionized and an ion beam is produced using an ion source.

In step 920, the ion beam is received using a tandem mass spectrometer. The tandem mass spectrometer is configured to perform one or more MS/MS scans or a beginning MS scan and one or more MS/MS scans of the ion beam during each cycle time of a plurality of cycle times.

In step 930, for a beginning MS scan and/or each MS/MS scan of a plurality of MS/MS scans for each cycle time of the plurality of cycle times a series of steps are performed using a processor of computing resources controlling the instrument.

In step 940, a previous percentage transmission, a previous TIC of the ion beam, and a previous maximum detected intensity (e.g. the value of highest mass peak in a MS spectra) measured for the beginning MS or each MS/MS scan in a previous cycle and a current percentage transmission of the ion beam are received.

In step 950, a target percentage transmission of the ion beam is calculated based on the previous percentage transmission and the previous TIC or previous intensity.

In step 960, an equilibration time is calculated based on the current percentage transmission and the target percentage transmission.

In step 970, a skimmer of the tandem mass spectrometer is controlled to attenuate the ion beam to the target percentage transmission to prevent saturation of a detector of the tandem mass spectrometer and to increase the dynamic range of the tandem mass spectrometer.

In step 980, control the tandem mass spectrometer to perform the beginning MS scan or an MS/MS scan after the calculated equilibration time to reduce the cycle time.

In various embodiments, computer program products include a tangible computer-readable storage medium whose contents include a program with instructions being executed on a processor controlling a mass analysis instrument so as to render the mass analysis instrument operative to perform a method for dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission. This method is performed by a system that includes one or more distinct software modules.

Figure 10:
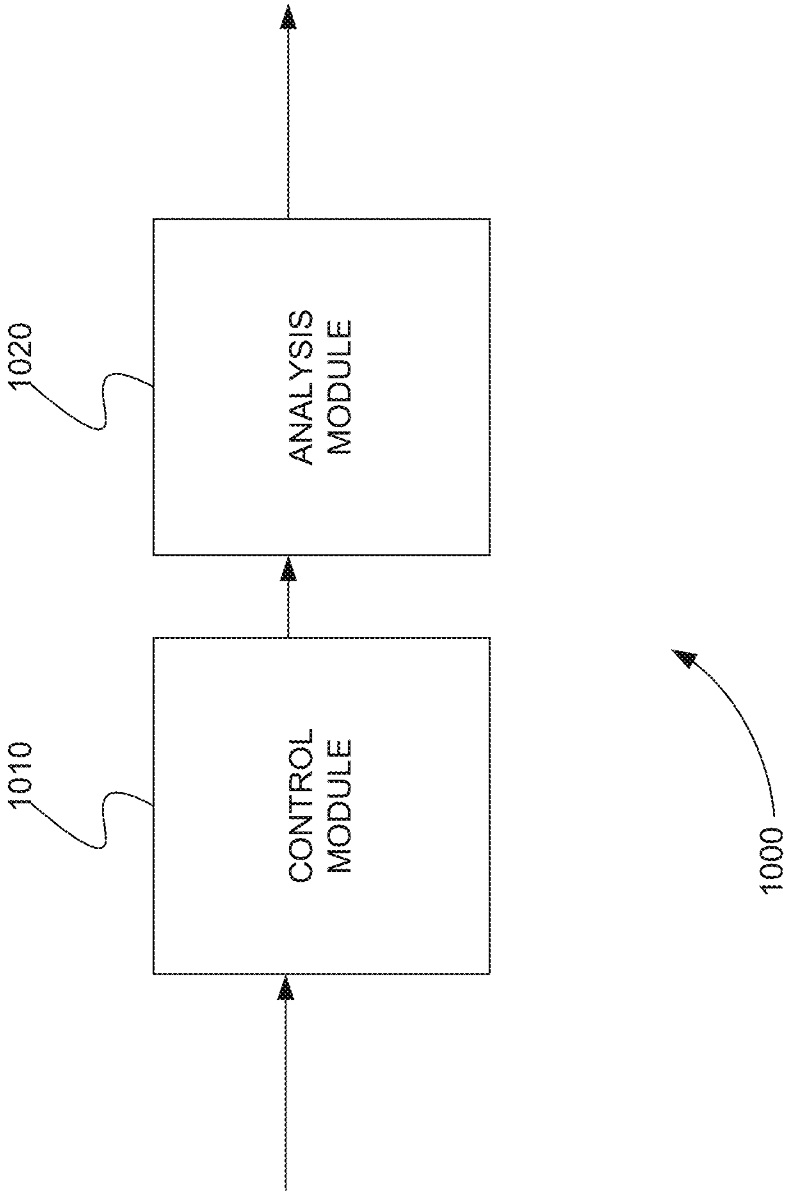
FIG. 10 is a schematic diagram of a system that includes one or more distinct software modules that perform a method for dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission, in accordance with various embodiments.

FIG. 10 is a schematic diagram of a mass analysis instrument 1000 that includes one or more distinct software modules that, when executed on a processor controlling the mass analysis instrument 1000, cause the mass analysis instrument to perform a method for dynamically changing the equilibration time between MS/MS scans or between mass spectrometry MS and MS/MS scans of a tandem mass spectrometer within each cycle time of a plurality of cycle times or between cycle times based on a calculated target percentage transmission and a current percentage transmission, in accordance with various embodiments. Mass analysis instrument 1000 includes input control module 1010 and analysis module 1020.

Control module 1010 controls an ion source to ionize a sample and produce an ion. Control module 1010 controls a tandem mass spectrometer to receive the ion beam. The tandem mass spectrometer is configured to perform one or more MS/MS scans or a beginning MS scan and one or more MS/MS scans of the ion beam during each cycle time of a plurality of cycle times.

For a beginning MS scan and/or each MS/MS scan of a plurality of MS/MS scans for each cycle time of the plurality of cycle times control module 1010 and analysis module 1020 perform a number of steps.

Control module 1010 receives a previous percentage transmission value, a previous total ion current (TIC) of the ion beam, and a previous intensity of the highest mass peak measured for the beginning MS or each MS/MS scan in a previous cycle and a current percentage transmission of the ion beam.

Analysis module 1020 calculates a target percentage transmission of the ion beam based on the previous percentage transmission value and the previous TIC or previous intensity. Analysis module 1020 calculates an equilibration time for a next cycle based on the current percentage transmission and the target percentage transmission.

Control module 1010 controls a skimmer of the tandem mass spectrometer to attenuate the ion beam to the target percentage transmission to prevent saturation of a detector of the tandem mass spectrometer and to increase the dynamic range of the tandem mass spectrometer. Control module 1010 controls the tandem mass spectrometer to delay performing the beginning MS scan or each MS/MS scan until after a current calculated equilibration time to reduce each cycle time. The current calculated equilibration time based on, at least, a current percentage transmission value of an ion current received at an ion detector of the mass analysis instrument 1000 and a target percentage transmission value.

Figure 11:
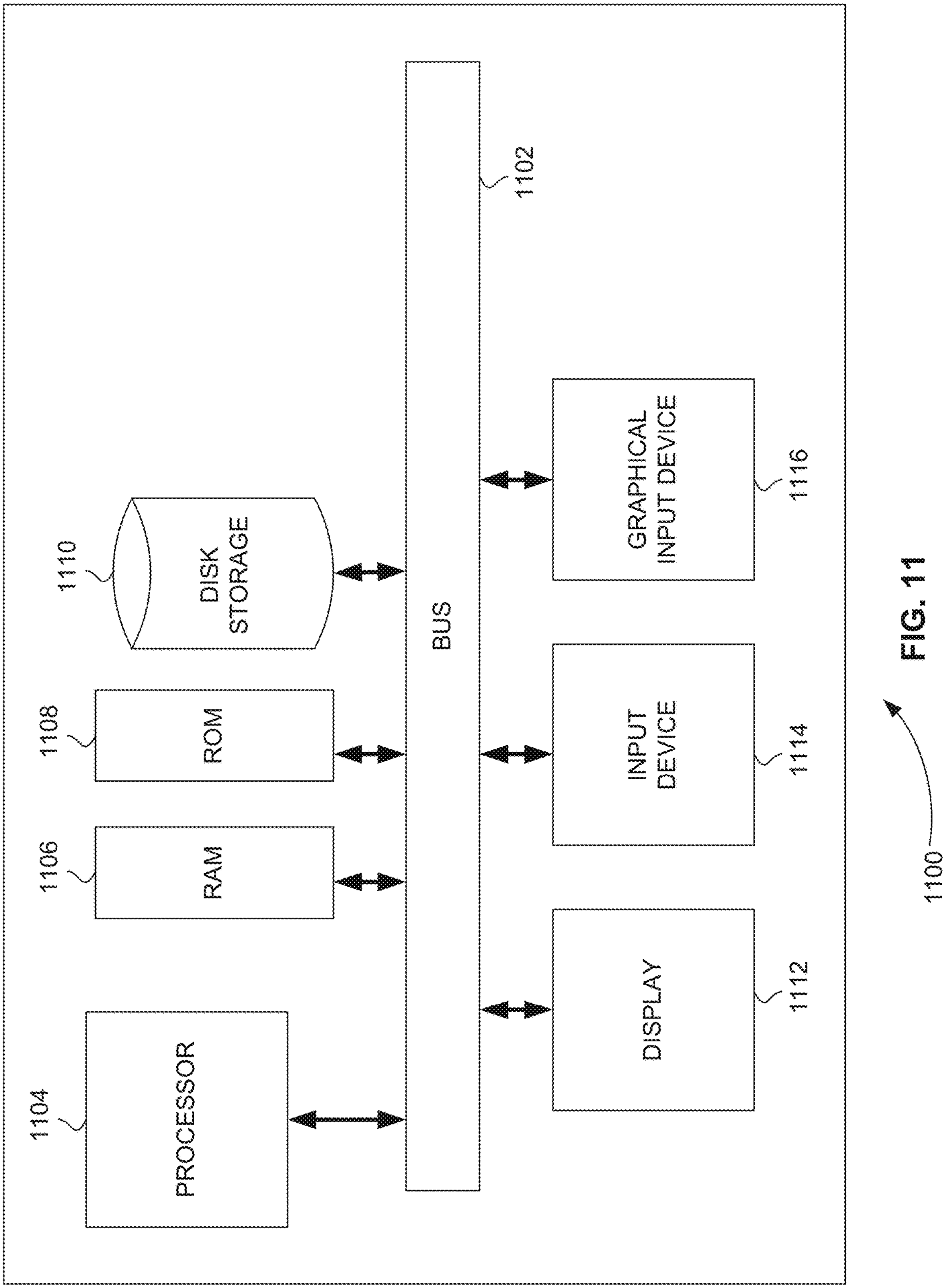
FIG. 11 is a block diagram that illustrates a computer system, upon which embodiments of the present teachings may be implemented.

FIG. 11 is a block diagram that illustrates exemplary computing resources 1100, upon which embodiments of the present teachings may be implemented. The computing resources 1100 may comprise a single computing device, or may comprise a plurality of distributed computing devices in operative communication with components of a mass analysis instrument. In this example, computing resources 1100 includes a bus 1102 or other communication mechanism for communicating information, and a processor 1104 coupled with bus 102 for processing information. As will be appreciated, the processor 1104 may comprise a plurality of processing elements or cores, and furthermore a plurality of processors 1104 may be provided to control or manage the mass analysis instrument.

Computing resources 1100 also includes a volatile memory 1106, which can be a random access memory (RAM) or other dynamic storage device, coupled to bus 1102 for storing instructions to be executed by processor 1104. Volatile memory 1106 also may be used for storing temporary variables or other intermediate information during execution of instructions to be executed by processor 1104. Computing resources 1100 further includes a static, non-volatile memory 1108, such as illustrated read only memory (ROM) or other static storage device, coupled to bus 1102 for storing information and instructions for processor 1104. A storage device 1110, such as a storage disk or storage memory, is provided and coupled to bus 1102 for storing information and instructions.

Optionally, computing resources 1100 may be coupled via bus 1102 to a display 1112 for displaying information to a computer user. An optional user input device 1114, such as a keyboard, may be coupled to bus 1102 for communicating information and command selections to processor 1104. An optional graphical input device 1116, such as a mouse, a trackball or cursor direction keys, may be coupled to bus 1102 for communicating graphical user interface information and command selections to processor 1104.

A computing resources 1100 can perform the present teachings. Consistent with certain implementations of the present teachings, results are provided by computing resources 1100 in response to processor 1104 executing instructions contained in memory 1106. Such instructions may be read into memory 1106 from a non-transitory computer-readable medium, such as storage device 1110. Execution of the instructions contained in memory 1106 by the processor 1104 render the mass analysis instrument operative to perform methods described herein. Alternatively, hard-wired circuitry may be used in place of or in combination with software instructions to implement the present teachings. Thus, implementations of the present teachings are not limited to any specific combination of hardware circuitry and software.

In various embodiments, computing resources 1100 can be connected to one or more other computer systems, like computing resources 1100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

In accordance with various embodiments, instructions configured to be executed by a processor 1104 to perform a method, or render the mass analysis instrument operative to carry out the method, are stored on a computer-readable medium. The computer-readable medium can be a device that stores digital information. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for conducting mass analysis in which the equilibration time decreases in response to an increase in ion beam transmission, comprising:
- in a first mass analysis cycle,
  - attenuating an ion beam to a first percentage transmission value and
  - selecting one or more precursor ions of the attenuated ion beam with a mass filter after a first equilibration time; and
- in a next mass analysis cycle immediately following the first mass analysis cycle,
  - determining a second percentage transmission value using the first percentage transmission value and at least one other experimental parameter,
  - determining that the second percentage transmission value is greater than the first percentage transmission value,
  - selecting a second equilibration time that is less than the first equilibration time,
  - attenuating the ion beam to the second percentage transmission value, and
  - selecting one or more precursor ions of the attenuated ion beam after the second equilibration time.

2. The method of claim 1, wherein the at least one other experimental parameter comprises a highest detected intensity of the attenuated ion beam from the first mass analysis cycle.

3. The method of claim 1, wherein the at least one other experimental parameter comprises a measured total ion current (TIC) from the first mass analysis cycle.

4. The method of claim 1, wherein the first mass analysis cycle and the next mass analysis cycle are cycles of two sequential mass spectrometry (MS) scans.

5. The method of claim 1, wherein the first mass analysis cycle and the next mass analysis cycle are cycles of two sequential mass spectrometry/mass spectrometry (MS/MS) scans.

6. A method for conducting mass analysis in which the equilibration time increases in response to a decrease in ion beam transmission, comprising:

in a first mass analysis cycle, attenuating an ion beam to a first percentage transmission value and selecting one or more precursor ions of the attenuated ion beam with a mass filter after a first equilibration time, wherein the first equilibration time is greater than the second equilibration time; and in a next mass analysis cycle immediately following the first mass analysis cycle, determining a second percentage transmission value using the first percentage transmission value and at least one other experimental parameter, determining that the second percentage transmission value is less than the first percentage transmission value, selecting a second equilibration time that is greater than the first equilibration time, attenuating the ion beam to the second percentage transmission value, and selecting one or more precursor ions of the attenuated ion beam after the second equilibration time.

7. The method of claim 6, wherein the at least one other experimental parameter comprises a highest detected intensity of the attenuated ion beam from the first mass analysis cycle.

8. The method of claim 6, wherein the at least one other experimental parameter comprises a measured total ion current (TIC) from the first mass analysis cycle.

9. The method of claim 6, wherein the first mass analysis cycle and the next mass analysis cycle are cycles of two sequential mass spectrometry (MS) scans.

10. The method of claim 6, wherein the first mass analysis cycle and the next mass analysis cycle are cycles of two sequential mass spectrometry/mass spectrometry (MS/MS) scans.

11. A mass analysis system comprising:

a mass analyzer operative to:

receive an ion beam;

attenuate the ion beam with a skimmer to a percentage transmission value, wherein the percentage transmission value is a percentage of the ion beam not attenuated; and, select one or more precursor ions of the attenuated ion beam with a mass filter after an equilibration time selected from at least a first equilibration time and a second equilibration time, wherein the first equilibration time is greater than the second equilibration time;

a detector operative to:

detect the selected one or more precursor ions; and, provide a mass analysis signal representative of the detected one or more precursor ions in a current mass analysis cycle to computing resources controlling the mass analysis system;

the computing resources operative to:

in a first mass analysis cycle, control the mass analyzer to attenuate the ion beam to a first percentage transmission value and select one or more precursor ions of the attenuated ion beam with a mass filter after the first equilibration time, in a next mass analysis cycle immediately following the first mass analysis cycle, determine a second percentage transmission value using the first percentage transmission value and at least one other experimental parameter, determine that the second percentage transmission value is greater than the first percentage transmission value, select the second equilibration time, control the mass analyzer to attenuate the ion beam to the second percentage transmission value and select one or more precursor ions of the attenuated ion beam with a mass filter after the second equilibration time.

12. The system of claim 11, wherein the at least one other experimental parameter comprises a highest detected intensity of the attenuated ion beam from the first mass analysis cycle.

13. The system of claim 11, wherein the at least one other experimental parameter comprises a measured total ion current (TIC) from the first mass analysis cycle.

14. The system of claim 11, wherein the first mass analysis cycle and the next mass analysis cycle are cycles of two sequential mass spectrometry (MS) scans.

15. The system of claim 11, wherein the first mass analysis cycle and the next mass analysis cycle are cycles of two sequential mass spectrometry/mass spectrometry (MS/MS) scans.

* * * * *